United States Patent [19]
Laves

[11] Patent Number: 5,407,714
[45] Date of Patent: Apr. 18, 1995

[54] CORRUGATED BOARD

[75] Inventor: Wolf-Henning Laves, Groenenbach, Germany

[73] Assignee: Hans Kolb Wellpappe GmbH & Co., Memmingen, Germany

[21] Appl. No.: 38,457

[22] Filed: Mar. 29, 1993

[30] Foreign Application Priority Data

| Mar. 30, 1992 | [DE] | Germany | 9204293 U |
| May 20, 1992 | [DE] | Germany | 9206863 U |
| Oct. 14, 1992 | [DE] | Germany | 42 34 689.4 |
| Feb. 3, 1993 | [EP] | European Pat. Off. | 93101663 |

[51] Int. Cl.$^6$ .......................... B32B 5/02; B65D 73/02
[52] U.S. Cl. .................................. 428/34.2; 206/328; 206/334; 206/524.3; 206/524.6
[58] Field of Search ............... 428/34.2; 206/328, 334, 206/524.2, 524.3, 524.6

[56] References Cited

U.S. PATENT DOCUMENTS

| 4,293,070 | 10/1981 | Ohlbach | 206/328 |
| 4,482,048 | 11/1984 | Blodgett . | |
| 4,528,222 | 7/1985 | Rzepecki et al. | 206/328 |
| 4,684,020 | 8/1987 | Ohlbach | 206/328 |
| 4,685,563 | 8/1987 | Cohen et al. . | |
| 4,706,438 | 11/1987 | Ohlbach | 206/328 X |
| 5,017,260 | 5/1991 | Bradford | 206/328 X |
| 5,205,406 | 4/1993 | Bradford | 206/328 |

FOREIGN PATENT DOCUMENTS

| 2947262 | 10/1980 | Germany . |
| 3214940 | 12/1982 | Germany . |
| 2174643 | 11/1986 | United Kingdom . |

Primary Examiner—Bryon P. Gehman
Attorney, Agent, or Firm—Laff, Whitesel, Conte & Saret, Ltd.

[57] ABSTRACT

Figure 12:
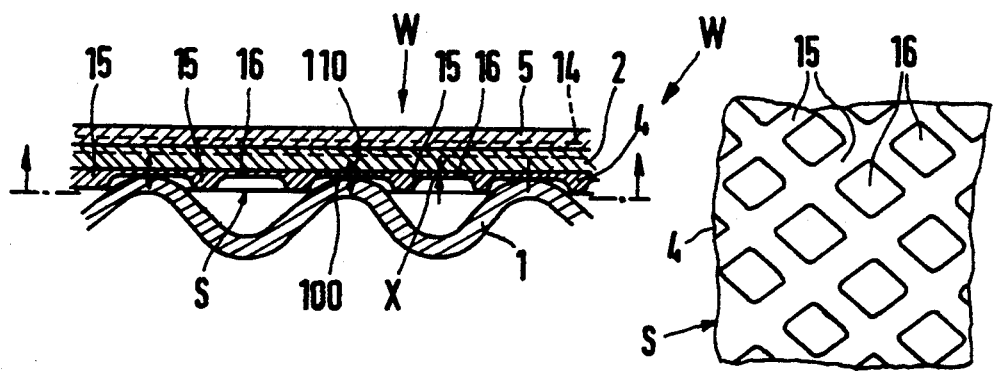

In the case of a corrugated board W, which comprises at least one corrugated core layer 1 and at least one flat cover layer 2, 3, at least one electrostatically-shielding layer 4 is provided in the interior structure between the core layer 1 and said cover layer 2, whereas the outer side of the corrugated board W is provided with a conducting lacquer 5, 6 applied to the cover layer 2, 3. The conducting lacquer 5, 6 may be combined with a corrosion inhibitor 14. The shielding layer 4 is formed either continuously, or such that it comprises interconnected layer components 80 and intermediate, interruptions 90 occupying a certain area and interrupting the areas which are glued together, or such that it comprises highly compacted, interconnected layer components 12 and intermediate, less highly compacted layer components 13, or such that it comprises high, interconnected layer components 15 and intermediate lower layer components 16 which occupy a certain area. (FIG. 12).

22 Claims, 4 Drawing Sheets

FIG. 1
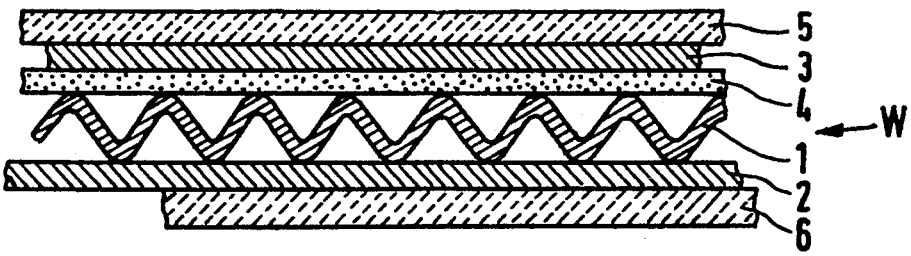
FIG. 2
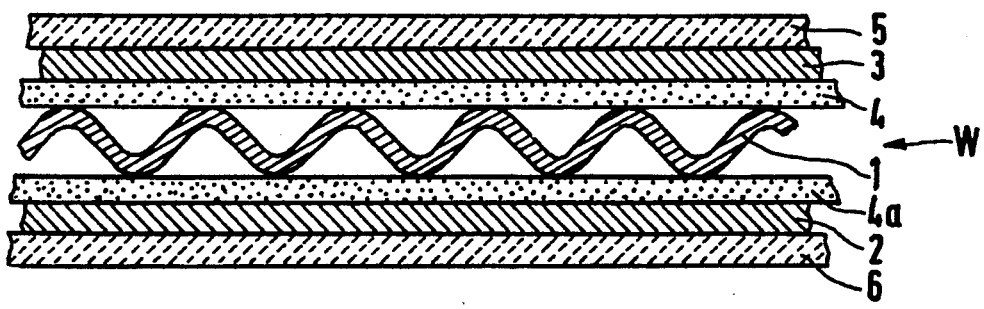
FIG. 3
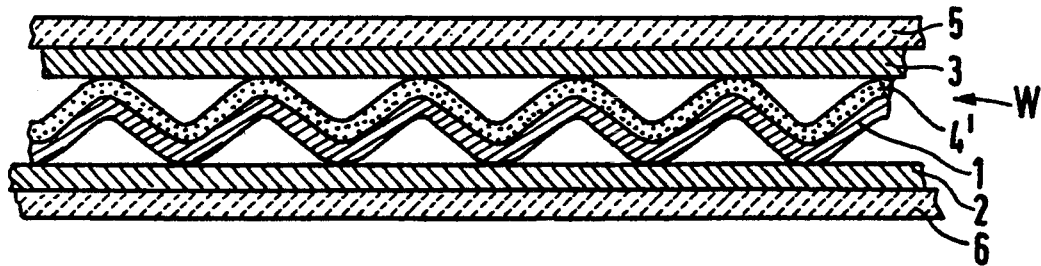
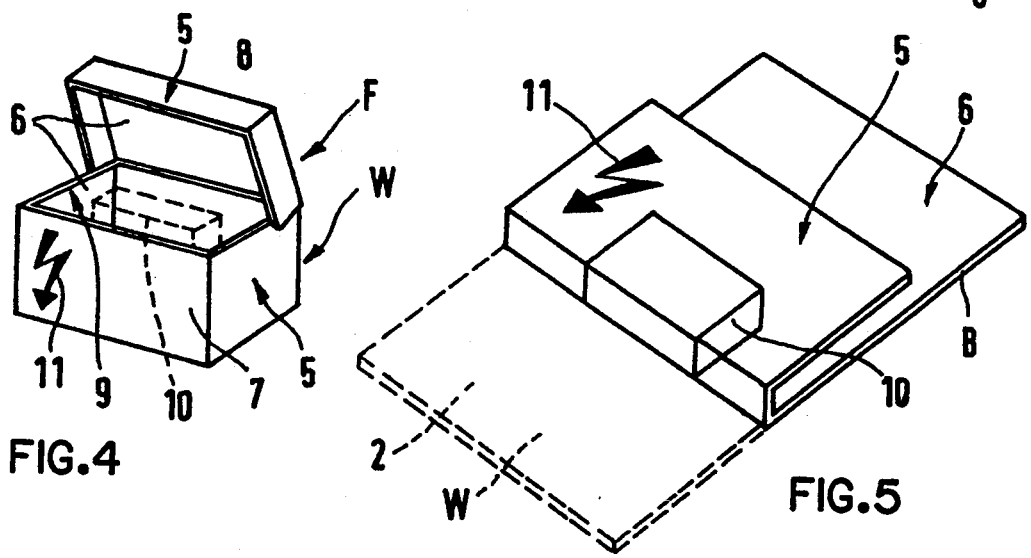
FIG. 4
FIG. 5

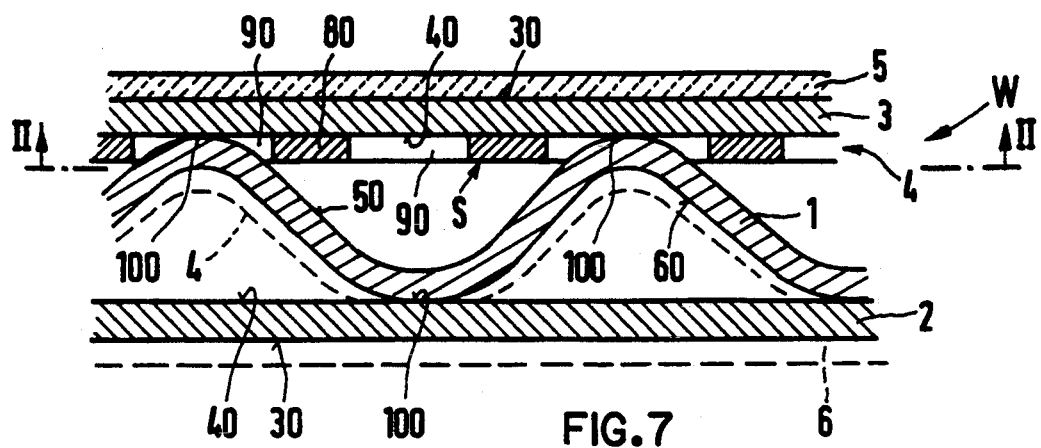
FIG.7
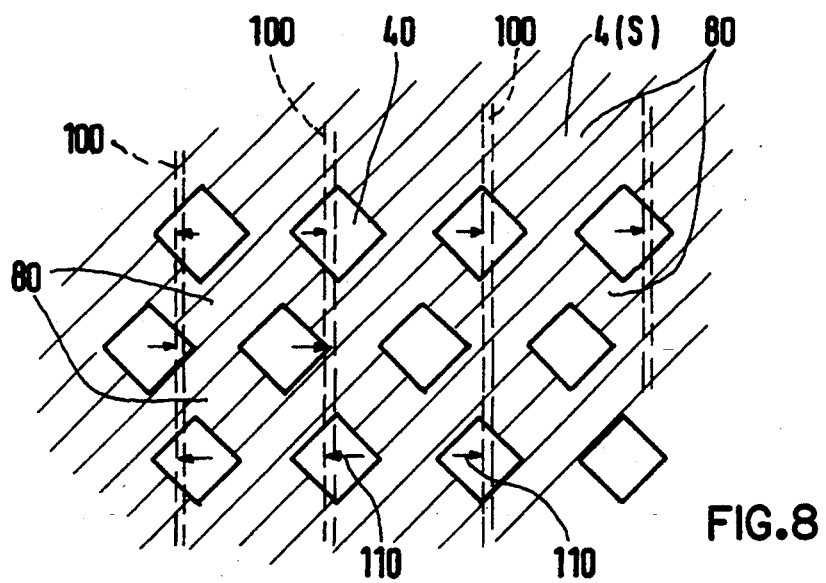
FIG.8
FIG.9a 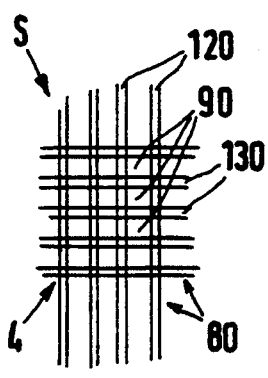 FIG.9b 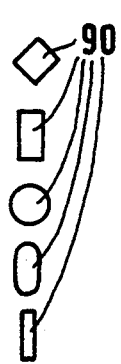 FIG.9c FIG.9d 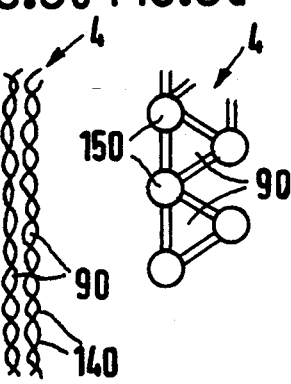 FIG.9e 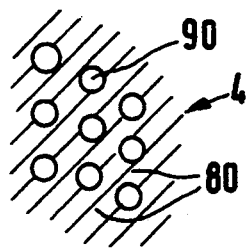

CORRUGATED BOARD

The present invention refers to a corrugated board according to the generic clause of claim 1 as well as to a folding case and a sheet material according to claims 16 and 17, which are formulated as parallel claims.

In the structure of a corrugated board known from U.S. Pat. No. 4,685,563, a continuous, shielding layer is provided in the interior of the structure. The outer surfaces of the corrugated board are untreated and free, respectively.

In the structure of a corrugated board known from U.S. Pat. No. 4,482,048, at least one shielding, full-area layer is provided, again in the interior of the structure. The outer surfaces of the corrugated board are untreated.

In the case of a folding case consisting of corrugated board, which is known from DE-B1-2947262, at least the free side of the cover layer facing the interior has been printed on with an aqueous emulsion having carbon particles dispersed therein.

DE-A-3214940 discloses a sheeting material which has been printed on with a network or latticework of intersecting lines of conductive printing colour on one side thereof or on both sides thereof. When kraft paper is used as a sheeting material for the outer cover layer of a corrugated board, the network is only printed on the outer surface thereof; the sheeting material is transparent; in the case of corrugated board, openings are provided which permit looking through.

EP-B1-0216311 discloses that a corrugated board used for a folding case is provided with a carbonaceous coating on the free side facing the interior and that an aluminum foil is incorporated into the corrugated board and bonded thereto, said aluminum foil being connected to the coating at least at individual points thereof.

The present invention is based on the task of providing a corrugated board of the type mentioned at the beginning as well as a folding case or a sheet material, which have a shielding layer of such a nature that the colour of and the imprints on the corrugated board can be chosen and designed freely, which are easy to dispose of or to recycle, and in the case of which effective protection against hard discharges is given.

The posed task is solved by the features contained in the characterizing clause of patent claim 1 as well as by the features contained in the characterizing clauses of claims 17 and 18, which are formulated as parallel claims.

By means of the low-ohmic layer provided in the interior of the corrugated board, effective shielding is achieved; said low-ohmic layer cannot be damaged from outside and the natural appearance of the corrugated board is not impaired. The necessary shielding effect can already be achieved by only one single layer, and this will reduce the amount of carbon and/or graphite used. The corrugated board can be disposed of in a convenient manner and it is easy to recycle. Several layers will be advantageous for reasons of safety. Due to the combined effect of said layer and of the conducting lacquer, a shielding effect will be achieved whose quality surpasses that of conventional shielding corrugated boards up to a factor of 5, one of the reasons for this fact being that paper is incorporated as a semi-insulator between the conducting lacquer and the low-ohmic layer. Hard discharges will no longer occur. The possibilities of designing the colour of and the imprints on the corrugated board are the same as in the case of a normal corrugated board. It will be expedient to treat each outer side of the corrugated board with the conducting lacquer. If only one layer is provided and if only one outer side is treated with the conducting lacquer, it will—with respect to the risk of punctures from inside—be expedient when said outer side is the outer side facing away from the interior of the folding case.

A good shielding effect is achieved with a coating comprising network-like or latticework-like, highly compacted layer components and intermediate weakly compacted layer components occupying a certain area. The highly compacted layer components define a marked Faraday's cage in which the weakly compacted layer components assist. In the case of this structural design of the layer, the amounts of carbon and/or graphite used can be reduced, and this will be of benefit to disposal and recycling. It will be expedient to form the highly compacted layer components by a plurality of successive printing processes. The weakly compacted layer components are formed, previously or subsequently, by full-area printing. These weakly compacted layer components permit the layers to be durably pasted together because the glue will penetrate more easily through them. Also in the case of a layer comprising network-like or latticework-like, interconnected high layer components and intermediate layer components, which occupy a certain area and which are lower in comparison with said high layer components, a good shielding effect will be achieved and the amounts of carbon and/or graphite used will be reduced. The glue by means of which the layers are glued together can penetrate the low layer components so that a durable glued connection of the layers will be obtained. The high layer components are applied by a plurality of successive printing processes and compacted in an expedient manner. The low layer components are applied previously or subsequently by one or two full-area printing processes.

It will be particularly simple to effect a durable interconnection of the individual layers by glueing, when the layer in question comprises interconnected layer components with intermediate interruptions extending up to the surfaces of the individual layers and interrupting the areas which are glued together. The Faraday's cage defined by the interconnected layer components guarantees good shielding. It will be expedient to effect high compacting of the layer components by a plurality of printing processes; it is, however, also imaginable to apply the layer components by spreadcoating or by spraying on.

In the case of a non-buckling, puncture-resistant corrugated board structure, which has a high strength resulting from its shape and which comprises two or more corrugated core layers as well as intermediate cover layers bonded to said core layers, a shielding layer can be provided in the interior of said corrugated board structure and the conducting lacquer can be provided on the outside thereof, viz. on at least one outer surface. It is, however, just as well imaginable to accommodate a plurality of shielding layers in the corrugated board structure and to treat both outer surfaces with the conducting lacquer.

Provided that the shielding layer and the conducting lacquer are constructed in accordance with the specifications of the standard CECC 00 015/I, 1991, a very good protection will be guaranteed for electronic components or articles which are sensitive to electrostatic charges or fields emanating from such charges. In the extremely low-ohmic layer, a low percentage of carbon and/or graphite will suffice. This will make the corrugated board, the folding cases, or the sheet material more easily recyclable. The discharge of harmful fields or voltages and the avoidance of hard discharges are guaranteed by the lacquer.

If the discharging lacquer is combined with a sublimable corrosion inhibitor, protection against corrosion of the sensitive articles packed in a folding case or in the sheet material will be achieved in addition to the shielding effect and the avoidance of hard discharges. Such corrosion inhibitors, which are preferably polar, organic salts having a cathodic and anodic protective effect, evaporate gradually, saturate the air surrounding the articles to be protected and deposit on bright metal surfaces. They inhibit the electrochemical processes resulting in corrosion and, in so doing, they exhaust themselves gradually. In combination with the conducting lacquer, the corrosion inhibitor is stored in a depot-like manner, and from this depot it will act gradually and thus over a long period of time. The lacquer and also the corrugated board structure can also act as a barrier causing an emission of the corrosion inhibitor in doses so that a uniform intensive corrosion protection effect will be obtained for a long period of time.

If the conducting lacquer is transparent and/or coloured and/or provided with an imprint, the corrugated board or the folding case or the sheet material can be designed freely or marked as a special material from the very beginning, e.g. by slight colouring. The shielding layer will not impair a free design. It is also imaginable to apply a printed image below the lacquer and to refer thus to the special possibilities of using the folding case or the sheet material, or to the content thereof.

Figure 10:
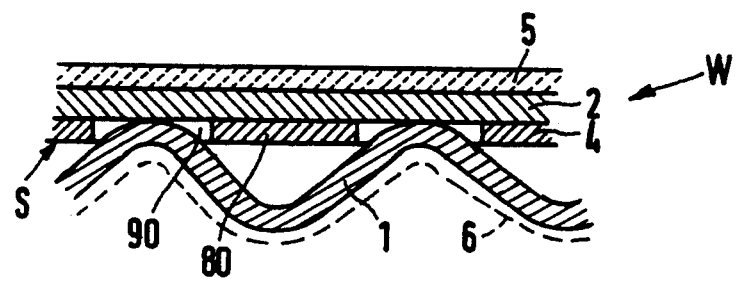
Figure 11:
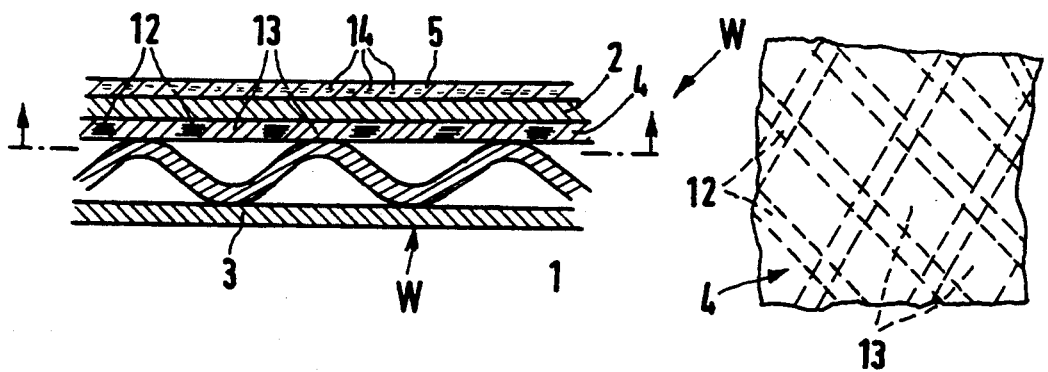

Embodiments of the subject matter of the present invention will be explained on the basis of the drawings, in which:

FIGS. 1, 2, 3 and 6 show cross-sections through various embodiments of the corrugated board, FIG. 4 shows a perspective view of a folding case consisting of corrugated board, FIG. 5 shows a perspective view of corrugated board sheet material for packing articles or producing blanks for folding cases, FIG. 7 shows a cross-section of an additional embodiment of the corrugated board, FIG. 8 shows a section in the corrugated board of FIG. 7, FIGS. 9a to e show detail variations of FIG. 8, FIG. 10 shows a section through an open corrugated board, FIG. 11 shows a cross-section and a top view of a detail of an additional embodiment, FIG. 12 shows a cross-section and a top view of a detail of an additional embodiment of a corrugated board.

A corrugated board W (FIG. 1) comprises a corrugated core layer 1 having attached thereto a cover layer 2, 3 on each of its two sides. The bottom side of the cover layer 3 facing the core layer has applied thereto a low-ohmic, electrostatically-shielding layer 4. Furthermore, one, or more expediently both cover layers 2, 3 have applied thereto a conducting lacquer 5, 6 on the outer surface thereof, which faces away from the core layer 1. The layer 4 contains carbon particles and/or graphite, the carbon material used being applied alone or in a mixture with a binding agent. The surface resistance of the layer 4 is $<10^4$ ohm/square, preferably $<10^1$ ohm/square. The surface resistance of the outer surface treated with the conducting lacquer 5, 6 lies between $10^5$ and $10^{12}$ ohm/square. According to the standard CECC 00 0015/I, 1991, the layer 4 is, consequently, electrostatically shielding, whereas the lacquer 5, 6 is electrostatically conducting.

In this figure and in the following figures, the shielding layer and the conducting lacquer are shown as exaggeratedly thick and independent coatings. In actual fact, however, they are thinner. The lacquer must be imagined to have penetrated into the respective outer surface.

Furthermore, FIG. 1 to 3 show standard corrugated boards. The principle according to the present invention may, however, just as well be used in the case of a socalled open corrugated board comprising only one corrugated core layer 1 and one flat cover layer 2 or 3, the layer 4 being then applied between the core layer 1 and the respective cover layer and the lacquer 5, 6 being applied to a free outer surface of the corrugated board, i.e. to the cover layer and/or to the core layer.

In the case of the corrugated board W according to FIG. 2, low-ohmic layers 4, 4a are applied to the cover layers 2, 3 on both sides of the core layer 1. The outer surfaces of the cover layers 2, 3, at least the outer surface of one cover layer, is/are treated with the conducting lacquer 5, 6 throughout the whole area thereof. In FIG. 3, the layer 4' is applied to the core layer side facing the cover layer 3. Both cover layers 2, 3 are treated with conducting lacquer 5, 6. It would just as well be possible that both sides of the core layer 1 carry a layer 4', or the lacquer could be applied to only one outer surface of the corrugated board W.

Figure 6:
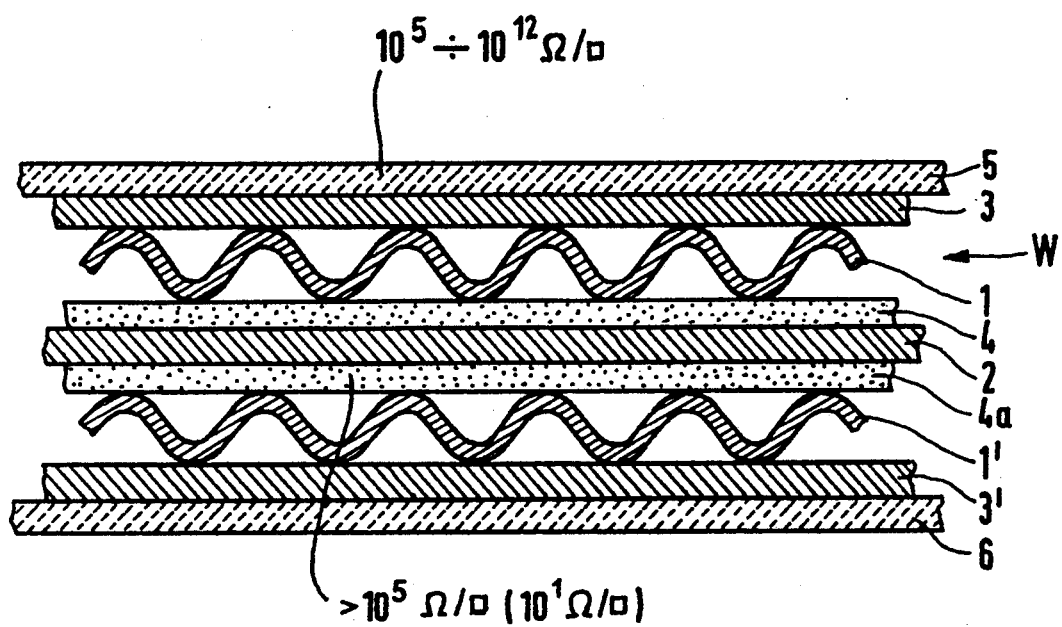

The corrugated board W according to FIG. 6 is constructed such that it will resist higher mechanical loads or provide higher rigidity. Two or more corrugated core layers 1, 1' are respectively separated by a cover layer 2 and covered by cover layers 3, 3' on the outside. The central cover layer 2 has applied thereto low-ohmic layers 4, 4a on both sides thereof. The free outer surfaces of the corrugated board, or at least the free outer surface of at least one cover layer 3, 3' is/are provided with a conducting lacquer 5, 6. In the case of all the above-mentioned embodiments, the outer surfaces of the corrugated board which are not treated with conducting lacquer may be left untreated. It is, however, just as well imaginable to provide them with some other protective layer of lacquer or with an impregnation.

The corrugated board according to FIG. 6 may also include only a single low-ohmic layer 4, or 4a. Furthermore, one or both core layers 1, 1' may serve to carry the low-ohmic layer (on one side or on both sides thereof), as in the case of FIG. 3. In FIG. 6, a low-ohmic layer may also be applied to one of the inner surfaces of a cover layer 3 or 3'. Finally, it is also imaginable to provide both outer cover layers 3, 3' with a low-ohmic layer 4, 4a on the inner surfaces thereof. If desired, the corrugated board may be provided with an imprint (11 in FIG. 4 and 5) on one, or on both of its outer surfaces. The imprint 11 can be provided on top of the lacquer or below the lacquer. It will be expedient, when the conducting lacquer is transparent, or slightly coloured, or clear.

A folding case F according to FIG. 4 is a squared box comprising a bottom part 7 and a cover 8, which is, in an expedient manner, formed such that it is connected to said bottom part 7 and which is adapted to be put over the opening of said bottom part 7. The interior, which is identified by reference numeral 9, serves to accommodate and protect at least one electrostatically endangered article, i.e. an electronic component, or an explosive, or highly inflammable chemical substance. The surfaces facing the interior and the outer surfaces have been treated with the conducting lacquer 5, 6. Reference numeral 11 indicates the printed image. If only one outer side of the corrugated board in the folding case F has been treated with the conducting lacquer, the lacquer should be applied to the outer surface of the folding case F. If only one layer is provided in the corrugated board structure, said layer should be positioned on the side of the core layer 1 facing away from the interior 9 because of the risk of punctures from inside.

FIG. 5 shows a sheet material B which consists of the corrugated board W according to one of the FIGS. 1 to 6 and which can be used for packing one or several articles 10, or for producing blanks for folding cases F. The article 10 is wrapped into the sheet material B, both surfaces of said sheet material B being treated with the conducting lacquer 5, 6 throughout their whole area. If desired, a printed image 11 is applied, or the sheet material B bears an imprint on one side or on both sides thereof.

The respective electrostatically-shielding layer 4, 4a, 4' included in the corrugated board structure is shown in FIG. 1, 2, 3 and 6 with a continuously uniform layer thickness.

The respective layer has been applied, in an expedient manner, by printing on, spraying on, spread-coating or the like. When the layer is applied by printing on, it will be expedient to use several successive printing processes so as to achieve the highest possible density. However—as will be explained hereinbelow—the respective layer can be formed either such that it is continuous, but not uniform in itself, or such that it includes interruptions occupying a certain area, said interruptions being provided for saving shielding material and for avoiding problems when the individual layers are glued together as well as problems with the durability of the glued connection.

The corrugated board W according to FIG. 7 includes in its structural design a flat cover layer 3, which is glued to the corrugated core layer 1 at least in the area of wave crests 100. The flat cover layer 2 is glued to the other side of the corrugated core layer 1. If desired, the cover layers 2, 3 and the core layer 1 may consist of several interconnected individual layers. The surfaces of the cover layers 2, 3 and of the core layer 1 are provided with reference numerals 30, 40, 50, 60. In the embodiment shown, the shielding layer 4 (S) is applied to the inner surface 40 of the cover layer 3. The layer 4 could just as well consist of a carrier material (plastics sheet, paper or textile), which is equipped with carbon and/or graphite and which is introduced between the layers.

In FIG. 7, a layer 4 consisting of continuous layer components 80 and of interruptions 90 delimited by said components 80 has been applied, said interruptions 90 being separate from one another and extending continuously up to the surface 40. The interruptions 90 occupy a certain area, (FIG. 8), and they are distributed such that they form a comparatively uniform pattern, said interruptions permitting the layers to be glued together more solidly and more durably because, in the area of said interruptions 90, the glue is not impaired by the material of the layer 4. It will be expedient when the total area occupied by the interruptions 90 is smaller than the total area occupied by the layer components 80. The interruptions 90 are formed and arranged in such a way that, in said interruptions 90, the wave crests 100 of the core layer 1 are, at least in certain areas, either in direct contact with, or almost in contact with the surface 40. The glue, which is normally used for bonding or glueing the layers of corrugated board, establishes a firm connection at these points. In FIG. 8, the connection areas are indicated by the respective arrows 110.

It will be expedient, when the pattern of said interruptions 90 is oriented at an oblique angle to, or perpendicularly to the orientation of the wave crests 100 so that a large number of regularly distributed points of intersection between the wave crests 100 and the interruptions 90 will be obtained. The layer components 80 are interconnected so that, on the whole, a Faraday's cage will be defined, when an article to be protected is placed into a folding case F formed by said corrugated board or wrapped in sheet material B consisting of said corrugated board W.

The interruptions 90 can have an arbitrary shape. It will be expedient when they are round, quadrangular or rhombic, as indicated in FIG. 8 and 9. The interconnected layer components 80 have been printed on in an expedient manner, said printing on being effected in several printing processes so as to obtain a high density.

In FIG. 7, it is indicated by a broken line that the layer 4 can, alternatively or additionally, be provided also on the surface 60 of the core layer 1, and that in this case, too, it comprises interconnected layer components and intermediate interruptions, said interruptions being separated from one another. It would just as well be possible to provide both surfaces 50, 60 with the layer 4. Additionally or alternatively, a layer 4 may also be arranged on the other surface 40 of the cover layer 2. The surface 30 of the cover layer 3 has applied thereto the conducting lacquer 5. Also the surface 30 of the cover layer 2 may have applied thereto the conducting lacquer 6 (indicated by a broken line).

According to FIG. 9a, the layer consists of lines, paths, rods or strips 120, 130, which are applied such that a network or latticework is defined and which cross one another at right angles or at any other desired angle, said lines, paths, rods or strips defining interconnected layer components 80. The intermediate interruptions 90 may extend continuously up to the surface, which has applied thereto said layer. If—as has been mentioned hereinbefore—the layer 4 is defined by an adequately equipped carrier material, said carrier material will have a pattern of interruptions e.g. of the type described hereinbefore.

In FIG. 9b, different geometrical shapes for the interruptions 90 are outlined. In FIG. 9c, the layer 4 consists of wavy lines 140, which cross one another and which delimit the interruptions 90. In FIG. 9d, the layer components in the layer 4 are approximately circular areas 150, which are interconnected by cross connections 160 and which delimit the interruptions 90. It will, however, be expedient to apply the layer components 80 in the manner shown in FIG. 9e, whereby separate, approximately circular interruptions 90 will be formed.

In FIG. 10, an open corrugated board W is outlined, said open corrugated board W comprising only one corrugated core layer 1 and one flat cover layer 2, the layer 4 being arranged between said cover layer 2 and said core layer 1. The layer 4, in turn, includes the interruptions 90, which occupy a certain area, between the interconnected layer components 80. The conducting lacquer 5 is applied to the cover layer 2. If necessary, also the opposite, free surface of the core layer 1 is treated with the conducting lacquer 6 (indicated by a broken line).

In the case of the embodiment according to FIG. 11, the layer 4 is provided in the structure of the corrugated board W between the core layer 1 and the flat cover layer 2 so as to effect electrostatic shielding, said layer being constructed such that, although it extends continuously and with an approximately uniform layer thickness, it inherently includes interconnected, highly compacted layer components 12 with intermediate layer components 13 which occupy a certain area and which have been compacted less highly. This structure of the layer 4 is obtained e.g. by forming in several printing processes the highly compacted layer components 12 and by previously or subsequently filling the interruptions, which remained open between the layer components 12, with the layer components 13 in one or two printing processes where the pressure applied is less high. This has, if desired, the advantage that, in the layer components 13 which have been compacted less highly, the glue will penetrate through the layer 4 and firmly connect the core layer 1 with the cover layer 2. A layer 4 having this type of structure could also be provided between the core layer 1 and the other cover layer 3, or on top of one, or of both surfaces of the core layer 1. At least the cover layer 2 has applied the conducting lacquer 5 to the outer surface thereof, said lacquer being preferably combined with a sublimable corrosion inhibitor 14. The corrosion inhibitor contains polar, organic salts, and vapours, which are set free from said salts, will condense on metal surfaces and form mono-molecular films, which will inhibit the electrochemical processes resulting in corrosion. The corrosion inhibitor 14 is either applied to the cover layer 2, prior to the application of the conducting lacquer 5, or it is admixed with the conducting lacquer 5. It is, however, just as well imaginable to apply the corrosion inhibitor to the conducting lacquer 5. If a conducting lacquer 5, 6 is applied to both cover layers 2, 3, it will be expedient to provide the corrosion inhibitor 14 at both sides of the corrugated board W. The corrosion inhibitor 14 uses the corrugated board structure as a depot from which it will evaporate slowly and protect articles, which have been placed into a folding case, or articles, which have been wrapped in sheet material, against corrosion for a long period of time.

Also in the case of the preceding embodiments of the corrugated board, of the folding case, or of the sheet material, the corrosion inhibitor 14 can be combined with the conducting lacquer 5, 6.

A particularly expedient embodiment of the corrugated board W is finally disclosed by FIG. 12. The shielding layer 4 positioned between the core layer 1 and the cover layer 2 consists of interconnected, high layer components 15 and of intermediate, layer components 16 which occupy a certain area and which are markedly lower than said high layer components 15. In the area of the layer components 16, the adhesive agent will be able to penetrate and form durable connection points 110. The combined effect of the high layer components 15 and of the low layer components 16, which occupy a certain area, produces an overall effect resulting in excellent shielding. The high layer components 15 have been formed, in an expedient manner, by repeated application of pressure, the low layer components 16 being formed previously or subsequently in one printing process, or two printing processes at the most, by subsequent full-area printing or by preliminary full-area printing. The thickness X of the low layer components has been selected, in an expedient manner, such that the glue can penetrate through said low layer components so that it will be possible to glue the wave crests 100 of the core layer 1 firmly to the cover layer 2. Said cover layer 2 has applied thereto the conducting lacquer 5, which is combined with the corrosion inhibitor 14, e.g. by previously applying said corrosion inhibitor to said cover layer 2 by spread-coating, by spraying on or by printing on. If a second cover layer (not shown in FIG. 12) is provided, an additional layer 4 could be arranged between the core layer and said additional cover layer. Furthermore, said second cover layer could then be treated with the conducting lacquer 6 and combined with the corrosion inhibitor 14. The layer 4 consisting of said high layer components 15 and of said low layer components 16 could just as well be applied to one or to both surfaces of the core layer 1.

The shielding layer 4 is applied e.g. in an amount of 5 g/m² in the wet state, which corresponds to a weight per unit area of 2.5 g/m² in the dry state. In the case of a layer 4 comprising high, interconnected layer components and intermediate, lower layer components occupying a certain area, the high layer components are formed by printing on three to five layers with intermediate interruptions, whereas the lower layer components are formed by a preceding or subsequent full-area application of one or two layers. If the corrosion inhibitor 14 is admixed with the conducting lacquer 5, 6, the admixing amount will be from 5 to 10% by weight. The conducting lacquer 5, 6 is—with or without corrosion inhibitor—applied in an amount of e.g. 25 to 30 g/m² (wet) weight.

I claim:

1. A corrugated board consisting of paperboard or paper material and used for folding cases or for sheet materials for protecting electrostatically endangered articles against electrostatic discharges and electric fields, comprising a corrugated core layer, a flat cover layer on one side of said corrugated core layer, a low ohmic electrostatically shielding layer (4) positioned between said corrugated core layer and said cover layer, said low ohmic electrostatically shielding layer is continuous with an approximately uniform thickness and is selected from shielding material selected from the group consisting of carbon black, graphite and mixtures thereof, said low ohmic electrostatically shielding layer (4) comprises a network or a latticework, interconnected, highly compacted layer components (12) as well as intermediate weakly compacted layer components (13) which occupy a certain area, said highly compacted layer components (12) are formed by repeated printing processes and the weakly compacted layer components (13) are formed by one or two full-areas printing processes, a continuous layer of conducting lacquer on one surface of said cover layer, said one surface facing away from said corrugated core layer and said low ohmic electrostatically shielding layer being separated from said conducting lacquer.

2. A corrugated board according to claim 1, wherein said weakly compacted layer components (13) have a thickness and a density of such a nature that an adhesive agent (110) will be able to penetrate said weakly compacted layer components and interconnect the core layer with said cover layer.

3. A corrugated board according to 1, wherein said shielding layer has a surface resistance of less than $10^4$ ohm/square, and said conducting lacquer has a surface resistance between $10^5$ and $10^{12}$ ohm/square.

4. The corrugated board of claim 1, wherein said corrugated core layer has a first core face and a second core face, a first cover layer covering said first core face, a second cover layer covering said second core face, said shielding layer is between said first core face and said first cover layer, said first cover layer having a first inner cover face facing said core layer and a first outer cover face facing away from said core layer, said second cover layer having a second inner cover face facing said core layer and a second outer cover face facing away from said core layer, and said layer of conductive lacquer being on said first outer cover face or said second outer cover.

5. The corrugated board of claim 4 wherein said shielding layer has a surface resistance of less than $10^4$ ohm/square, and said conducting lacquer has a surface resistance between $10^5$ and $10^{12}$ ohm/square.

6. The corrugated board of claim 1 wherein there is a first corrugated core layer and a second corrugated core layer, said first core layer having a first outer core side and a first inner core side, said second core layer having a second outer core side and a second inner core side, said first inner core side facing said second inner core side,
- an inner cover layer separating said first and said second core layers, said inner cover layer having a first inner cover layer side and a second inner cover layer side,
- said shielding layer being a first shielding layer on said first cover layer side and a second shielding layer on said second cover layer side,
- a first outer cover layer on said first outer core side, said first outer cover layer having a first outer cover layer side facing away from said first outer core side,
- a second outer cover layer on said second outer core side,
- said second outer cover layer having a second outer cover layer side facing away from said second outer core side,
- a first layer of conductive lacquer on said first outer cover layer side, and
- a second layer of conductive lacquer on said second outer cover layer side.

7. The corrugated board of claim 6 wherein said first and second shielding layers each have a surface resistance of less than $10^4$ ohm/square, and said first and second layers, of conducting lacquer each have a surface resistance between $10^5$ and $10^{12}$ ohm/square.

8. A corrugated board consisting of paperboard or paper material and used for folding cases or for sheet materials for protecting electrostatically endangered articles against electrostatic discharges and electric fields, comprising
- a corrugated core layer,
- a flat cover layer on one side of said corrugated core layer,
- a low ohmic electrostatically shielding layer (4) positioned between said corrugated core layer and said cover layer, said low ohmic electrostatically shielding layer is continuous and is selected from shielding material selected from the group consisting of carbon black, graphite and mixtures thereof, said low ohmic electrostatically shielding layer (4) consists of network or latticework, interconnected, high layer components (15) as well as of intermediate layer components (16) which occupy a certain area and which are lower in comparison with said high layer components (15),
- a continuous layer of conducting lacquer on one surface of said cover layer, said one surface facing away from said corrugated core layer and said low ohmic electrostatically shielding layer being separated from said conducting lacquer.

9. A corrugated board according to claim 8, wherein said intermediate layer components (16) have a thickness and a density of such a nature that an adhesive agent (110) will be able to penetrate said intermediate layer components and interconnect said corrugated core layer with said cover layer.

10. A corrugated board according to claim 9 wherein in the areas of the high layer components (15), the low ohmic electrostatically shielding layer (4) consists of a plurality of printed layers, which are positioned one on top of the other and which are bonded to one another, and in the areas of the low layer components (16), it consists of only one or two printed layers.

11. The corrugated board of claim 8 wherein said corrugated core layer has a first core face and a second core face, a first cover layer covering said first core face, a second cover layer covering said second core face, said shielding layer being between said first core face and said first cover layer, said first cover layer having a first inner cover face facing said core layer and a first outer cover face facing away from said core layer, said second cover layer having a second inner cover face facing said core layer and a second outer cover face facing away from said core layer, and said layer of conductive lacquer being on said first outer cover face or said second outer cover.

12. The corrugated board of claim 11 wherein said shielding layer has a surface resistance of less than $10^4$ ohm/square, and said conducting lacquer has a surface resistance between $10^5$ and $10^{12}$ ohm/square.

13. The corrugated board of claim 8 wherein there is a first corrugated core layer and a second corrugated core layer, said first core layer having a first outer core side and a first inner core side, said second core layer having a second outer core side and a second inner core side, said first inner core side facing said second inner core side,
- an inner cover layer separating said first and said second core layers, said inner cover layer having a first inner cover layer side and a second inner cover layer side,
- said shielding layer being a first shielding layer on said first cover layer side and a second shielding layer on said second cover layer side,
- a first outer cover layer on said first outer core side, said first outer cover layer having a first outer cover layer side facing away from said first outer core side,
- a second outer cover layer on said second outer core side, said second outer cover layer having a second outer cover layer side facing away from said second outer core side, a first layer of conductive lacquer on said first outer cover layer side, and a second layer of conductive lacquer on said second outer cover layer side.

14. The corrugated board of claim 13 wherein said first and second shielding layers each have a surface resistance of less than $10^4$ ohm/square, and said first and second layers of conducting lacquer each have a surface resistance between $10^5$ and $10^{12}$ ohm/square.

15. The corrugated board of claim 8 wherein said shielding layer has a surface resistance of less than $10^4$ ohm/square, and said conducting lacquer has a surface resistance between $10^5$ and $10^{12}$ ohm/square.

16. A corrugated board consisting of paperboard or paper material and used for folding cases or for sheet materials for protecting electrostatically endangered articles against electrostatic discharges and electric fields, comprising a corrugated core layer, a flat cover layer on one side of said corrugated core layer, a low ohmic electrostatically shielding layer positioned between said corrugated core layer and said cover layer, said low ohmic electrostatically shielding layer is continuous with an approximately uniform thickness and is selected from shielding material selected from the group consisting of carbon black, graphite and mixtures thereof, said low ohmic electrostatically shielding layer (4) comprises layer components (80, 120, 130, 140, 150, 160), which are interconnected in the form of a network or latticework, with intermediate interruptions (90) occupying a certain area, extending continuously upwardly from a surface of said low ohmic electrostatically shielding layer, a continuous layer of conducting lacquer on one surface of said cover layer, said one surface facing away from said corrugated core layer and said low ohmic electrostatically shielding layer being separated from said conducting lacquer.

17. The corrugated board of claim 16 wherein said corrugated core layer has a first core face and a second core face, a first cover layer covering said first core face, a second cover layer covering said second core face, said shielding layer being between said first core face and said first cover layer, said first cover layer having a first inner cover face facing said core layer and a first outer cover face facing away from said core layer, said second cover layer having a second inner cover face facing said core layer and a second outer cover face facing away from said core layer, and said layer of conductive lacquer being on said first outer cover face or said second outer cover.

18. The corrugated board of claim 17 wherein said shielding layer has a surface resistance of less than $10^4$ ohm/square, and said conducting lacquer has a surface resistance between $10^5$ and $10^{12}$ ohm/square.

19. The corrugated board of claim 16 wherein there is a first corrugated core layer and a second corrugated core layer, said first core layer having a first outer core side and a first inner core side, said second core layer having a second outer core side and a second inner core side, said first inner core side facing said second inner core side, an inner cover layer separating said first and said second core layers, said inner cover layer having a first inner cover layer side and a second inner cover layer side, said shielding layer being a first shielding layer on said first cover layer side and a second shielding layer on said second cover layer side, a first outer cover layer on said first outer core side, said first outer cover layer having a first outer cover layer side facing away from said first outer core side, a second outer cover layer on said second outer core side, said second outer cover layer having a second outer cover layer side facing away from said second outer core side, a first layer of conductive lacquer on said first outer cover layer side, and a second layer of conductive lacquer on said second outer cover layer side.

20. The corrugated board of claim 19 wherein said first and second shielding layers each have a surface resistance of less than $10^4$ ohm/square, and said first and second layers of conducting lacquer each have a surface resistance between $10^5$ and $10^{12}$ ohm/square.

21. The corrugated board of claim 16 wherein said shielding layer has a surface resistance of less than $10^4$ ohm/square, and said conducting lacquer has a surface resistance between $10^5$ and $10^{12}$ ohm/square.

22. A corrugated board (W) consisting of paperboard or paper material and used for folding cases (F) or for sheet materials (B) for protecting electrostatically endangered articles (10) against electrostatic discharges and electric fields, comprising at least one corrugated core layer (1, 1'), a flat cover layer (2) on at least one side of said core layer, at least one low ohmic electrostatically shielding layer (4, 4a, 4'5) positioned between said core layer and said cover layer, said shielding layer being selected from shielding material selected from the group consisting of carbon black, graphite and mixtures thereof, a continuous layer of conducting lacquer (5,6) on one surface of said cover layer, said one surface facing away from said core layer, and said shielding layer being separated from said conducting lacquer.

* * * * *